Jan. 12, 1943.  P. R. HORNBROOK  2,308,365
APPARATUS FOR CONVEYING
Filed Nov. 28, 1940  4 Sheets-Sheet 1
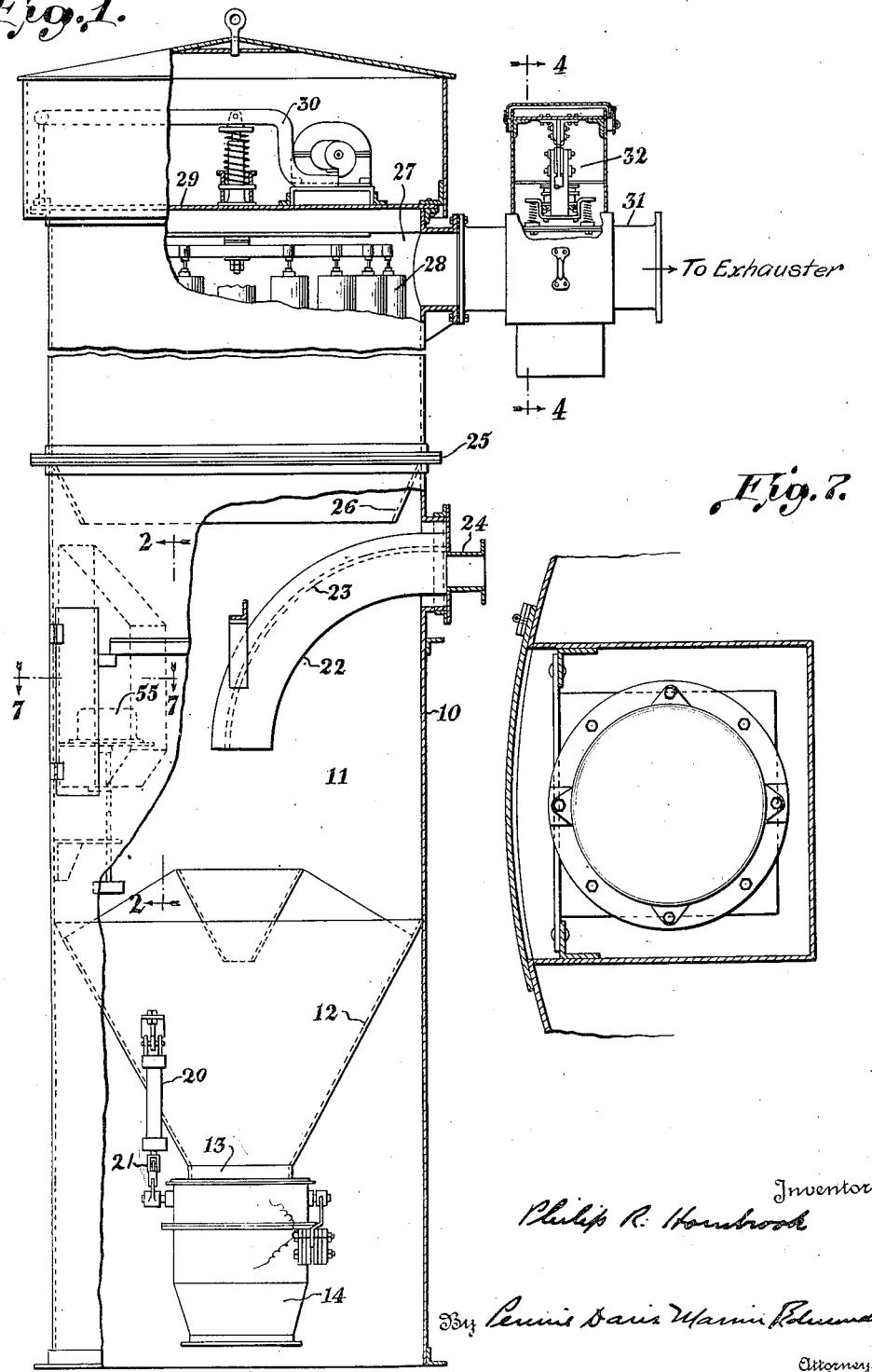

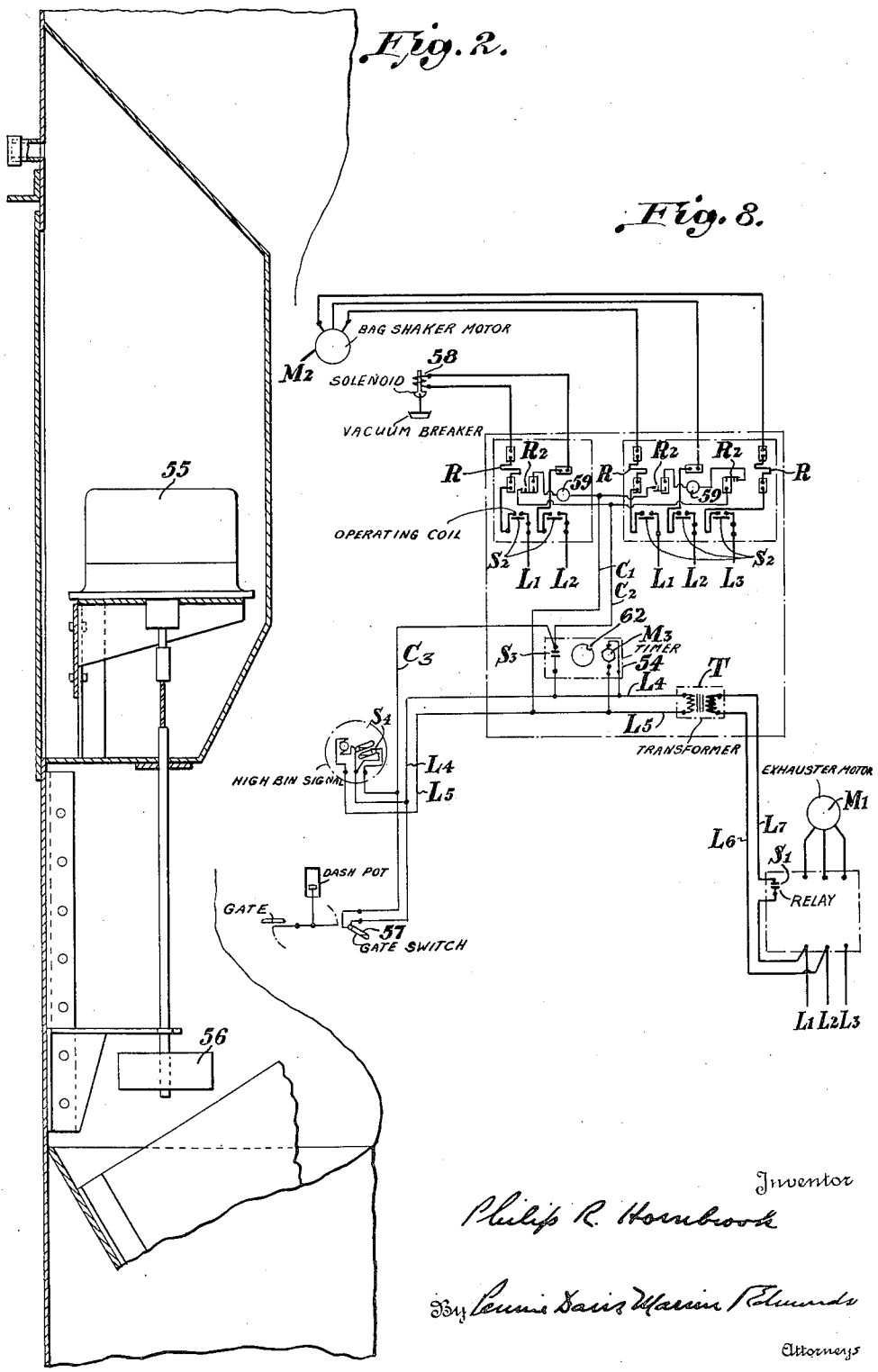

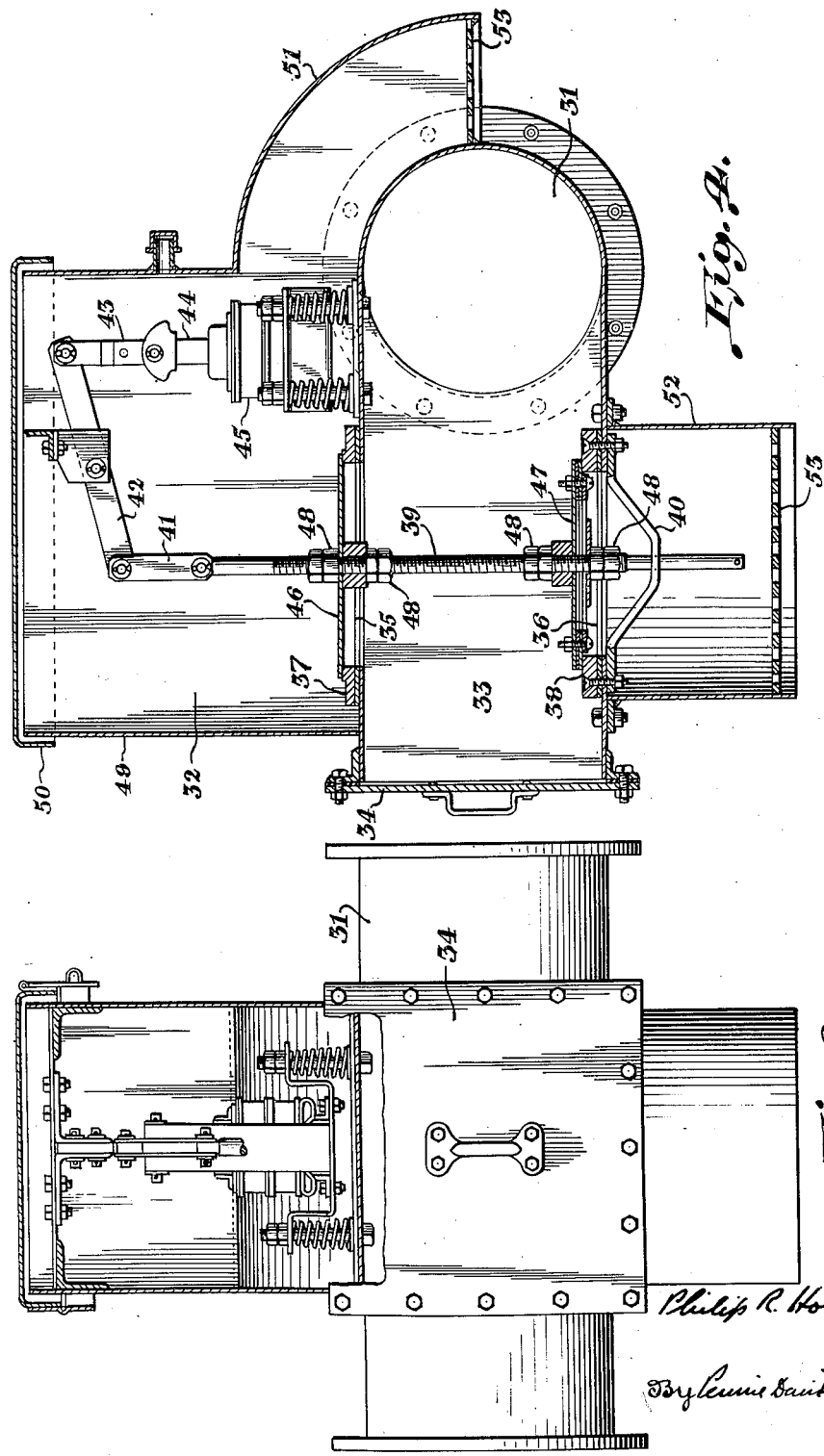

Patented Jan. 12, 1943

2,308,365

UNITED STATES PATENT OFFICE 2,308,365

APPARATUS FOR CONVEYING

Philip R. Hornbrook, Allentown, Pa., assignor to Fuller Company, Catasauqua, Pa., a corporation of Delaware Application November 28, 1940, Serial No. 367,652

10 Claims. (Cl. 302—59)

This invention relates to the pneumatic conveying of pulverulent, granular, and crushed materials in systems operated under partial vacuum, and more particularly to a novel apparatus for conveying such materials pneumatically according to an automatically repeated cycle of operation, during which the material being conveyed is delivered to a receiver for a predetermined time, after which conveying is interrupted and the accumulated material is discharged. The new apparatus is of general utility and may be employed for the handling of materials of the classes commonly conveyed pneumatically, such as lime, soda ash, grains, seeds, crushed coal, pebble lime, phosphate rock, and other materials of similar physical characteristics.

The conveyor of the invention includes a receiver connected to an exhauster and having a bottom opening provided with a gate closed by atmospheric pressure during conveying. The receiver may be connected to the atmosphere through a valve preferably of the balance type and when the valve is open, the receiver is short circuited and conveying stops, the gate is opened by the weight of material above it, and the contents of the receiver are discharged. The valve is periodically opened and closed by a timing mechanism which can be adjusted in accordance with the characteristics of the material being conveyed. The operation of the valve is further controlled by means actuated when an excess quantity of material enters the receiver, such means opening the valve and stopping the conveying when the excess occurs. Means are also provided for preventing closing of the valve to start conveying when the discharge gate of the receiver is open and the use of such means insures that the receiver will be completely discharged during each cycle of operation and that the gate will be fully closed before conveying begins.

The conveyor may be provided, if desired, with a filter provided with shaking mechanism and the control circuits for the valve may include connections for controlling the shaker mechanism and causing it to function during the periods when conveying is stopped.

For a better understanding of the invention, reference may be had to the accompanying drawings illustrating one form of the new apparatus.

Fig. 1 is a side elevation of the general assembly of the apparatus with parts broken away for purposes of illustration.

Fig. 2 is a sectional view taken on line 2—2 of Fig. 1.

Fig. 3 is a view in elevation with parts broken away of the valve mechanism.

Fig. 4 is a sectional view of the exhaust control taken on line 4—4 of Fig. 1.

Fig. 7 is a sectional view of a detail taken on lines 7—7 of Fig. 1.

Fig. 8 is a schematic wiring diagram of the power and control circuits.

Figure 5:
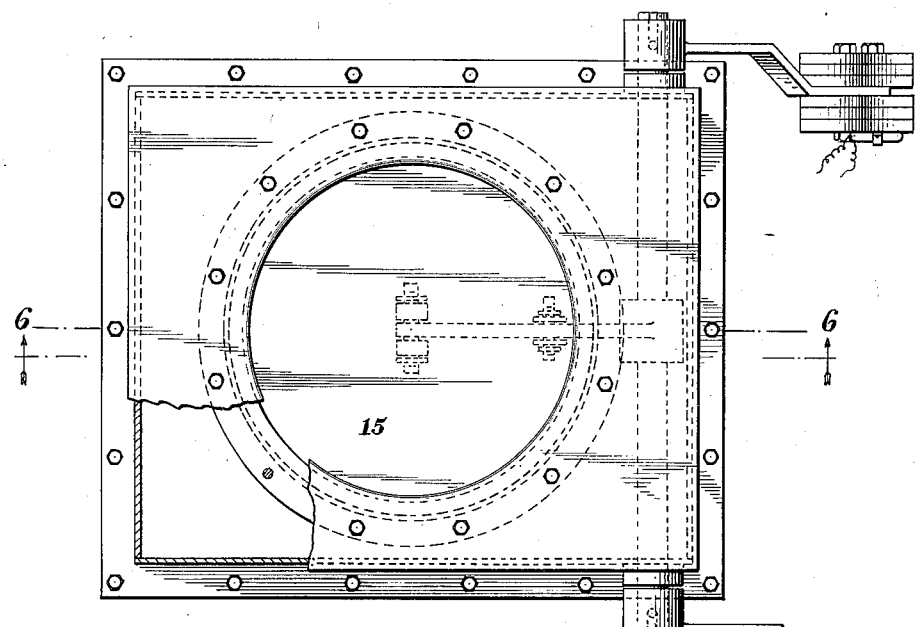
Fig. 5 is a top plan view of the discharge spout with parts broken away.
Figure 6:
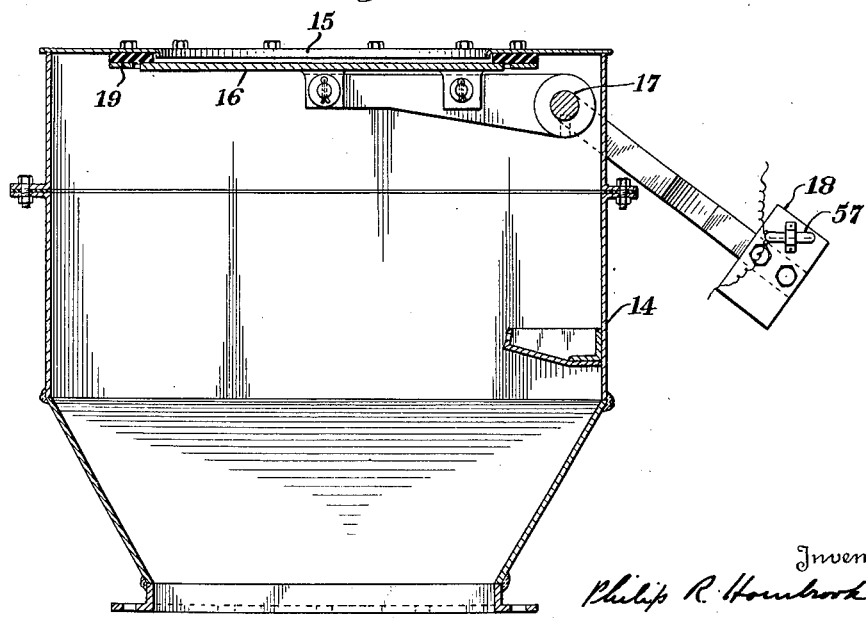
Fig. 6 is a sectional view taken on lines 6—6 of Fig. 5.

Referring to the drawings, and first to Figs. 1, 5 and 6, the apparatus will be seen to consist of a casing 10 having therein a receiving chamber 11. A conical discharge hopper 12 defines the lower end of the receiving chamber and terminates in a flanged discharge opening 13. A discharge chamber, denoted generally by the reference numeral 14, is attached by a companion flange to the flange of the conical hopper and an opening 15 in the top wall of the discharge chamber registers with the discharge opening 13. A valve 16 is secured to a rotatable shaft 17 carrying a crank suitably counterweighted at 18 and, under normal conditions, the valve closes the opening between the receiver and discharge chamber. A seat 19 of rubber or other suitable material is provided for the proper sealing of the valve, so as to maintain an air-tight enclosure. A check 20 of the usual dash-pot type is pivotally mounted on the outer surface of the chamber and has a plunger 21 pivotally connected to shaft 17, to insure a slow and even movement of the valve to its closed position after each opening.

An arcuate inlet spout 22, having a liner 23 of wear-resisting material, directs the incoming stream of air and entrained material downwardly toward the discharge opening, and the change of direction of the stream results in the particles therein being thrown from suspension and deposited in the conical hopper. Unless the material contains a substantial quantity of extremely fine material, this downward projection of the stream completely separates the material from the air stream before the air passes to the outlet conduit. A flanged nipple 24, at one end of the inlet spout 22, extends through the casing 10 for connection to the end of the usual conduit or pipe line (not shown) leading from the source of material supply.

The upper end of the receiving chamber is defined by a dividing wall 25 to which is attached a depending conical flange 26, the lower periphery of which defines the air discharge opening from the receiver. Openings (not shown) in the dividing wall 25 afford communication between the receiving chamber 11 and an exhaust chamber 27 and air leaving the receiver passes through filter bags in its travel into the exhaust chamber. Plate 29 closes the top of the exhaust chamber 27 and suitably located on this plate is a shaking mechanism 30 for cleaning the filter bags. The filtering apparatus may be of any standard construction and forms no specific part of the present invention, it being understood that the filtering means are desirable only when the material handled contains a portion of very fine particles which do not readily drop out of suspension.

An exhaust duct 31 connects the chamber 27 with a suitable exhaust means, preferably a positive-pressure exhauster which creates a partial vacuum within the receiver and produces the necessary air velocity in the conduit. A differential valve carried by the exhaust duct 31 and indicated generally at 32 is adapted in one position to open the exhaust duct to the atmosphere and thus reduce the effect of the exhauster upon the interior of the receiver. With particular reference to Figures 3 and 4, the means for short-circuiting the exhaust duct to the atmosphere will be seen to comprise a chamber 33 communicating directly with the exhaust duct 31 at one end and closed at its other end by a removable closure plate 34. The chamber 33 has an opening 35 in its upper face and an opening 36 of slightly less diameter in its lower face, and collars 37 and 38 surround these openings and constitute seats for a valve.

A valve stem 39, guided in its vertical movement by guide 40, is connected at its upper end by link 41 to one end of a pivoted lever 42, the other end of which is connected through link 43 to one end of a plunger 44 of a solenoid, indicated generally at 45. Valve members 46 and 47, carried by the stem and longitudinally adjustable thereon by nuts 48, are adapted to close openings 35 and 36 to the chamber 33 when the stem is in its lowermost position. Upon energization of the solenoid, the plunger 44 is moved downwardly and through the linkage 43, 42, and 41, the stem is moved to its upper position and the valves are opened, thus permitting air at atmospheric pressure to enter the chamber 33. By suitably adjusting the position of the valve members on the stem, the degree to which the valves are opened upon operation of the solenoid may be varied in order that a predetermined negative pressure may be maintained within the receiving chamber at the time the valve is open.

The upper portion of the valve and operating mechanism is enclosed in a chamber 49 having a top 50 which may be easily removed to afford access to the upper valve and mechanism for adjustment purposes. The chamber 49 is open to the atmosphere through a duct 51, the open end of the duct having secured therein a suitable screen 53 or the like for filtering out any extraneous matter before the air passing therethrough enters the chamber 49. The lower opening 36 is connected to the atmosphere through chamber 52, the open end of which also has secured therein a screen 53 similar to that at the end of duct 51.

The lower valve member 47 in its closed position seats on the collar 38 on the inside of the opening 36, while the upper valve member 46 seats upon the collar 37 on the outside of the opening 35. The lower opening is of slightly less effective diameter than the upper opening so that when the valve members are in their closed positions and chamber 33 is under reduced pressure, the valve is held seated by the excess of atmospheric pressure over the reduced pressure acting on the difference in the areas of the members exposed thereto. With this arrangement, the force to be applied by the solenoid to open the valve is much less than would be necessary if a valve with a single valve member only were employed.

The operation of the differential valve is controlled by a timer 54 which at predetermined intervals connects the operating coil of the solenoid 45 to a source of power so that it may open the valve. The valve members are adjustable on stem 39 and may be so adjusted that when the valve is in open position, the exhaust conduit is short-circuited to the atmosphere sufficiently to interrupt the conveying of material while still maintaining a slight reduction or depression in pressure within the receiver. Also, as will be later explained, during the period in which the valve is open, the shaker mechanism, if used, will operate to clean the filtering members. The slight reduction of pressure maintained within the receiver during the period in which the valve is open is insufficient to cause the gate to remain in its closed position if conveyed material is supported thereon. Under normal operating conditions the gate thus opens to discharge that material conveyed during each open period of the valve.

At times the conveying of material may increase in volume to such an extent that the receiver would become filled and flood before the timing switch would close the circuit to open the differential valve and cause emptying of the receiver. To insure against such an event, a material actuated switch mechanism, such as that disclosed in Lenhart Patent No. 2,116,075 or a high level indicator, indicated generally by the reference numeral 55, is placed within the receiving chamber. This indicator carries a rotating paddle 56 located at the point of maximum allowable height to which the material may rise in the receiver without liability of damage, and, should the material rise to this point and stop rotation of the paddle, switch mechanism within the indicator close the circuit to the solenoid to open the differential valve and interrupt conveying, regardless of whether or not the timer switch is open. The shaft supporting the paddle 56 may be of any desirable length, thus making it possible, by the changing of the length of shaft, to vary the height to which the material may rise before operation of this mechanism.

Efficient operation of the conveyor is obtained only when the discharge gate is completely closed and to insure such operation, a mercoid switch 57 carried by the gate mechanism is connected in the circuit controlling the operation of the differential valve in such a manner as to cause the valve to remain in an open position until the discharge gate is completely closed.

The power and control circuits for the exhauster motor M1, shaker motor M2, and solenoid 45 for operating the differential valves are schematically shown in Fig. 8. The motors are indicated as three wire machines, but other types of motors may be used when necessary to meet available power supply conditions. The power lines for the two motors M1, M2 and operating coil 58 of the solenoid 45 are represented by the lines L1, L2, and L3 and the power lines for the control circuit are represented by lines L4 and L5. The exhauster motor M1 is adapted to be connected to the power lines L1, L2 and L3 by a magnetic starter (not shown), the operation of this starter being controlled in any desirable manner, such as a push button located at a point convenient for the operator. A lower voltage is usually used for the control circuit and, for this purpose, lines L4 and L5 are connected to the secondary coil of a transformer T, the primary coil of this transformer being connected to the main source of power through lines L6 and L7. The circuit to the primary coil of the transformer T is controlled by a switch S1 comprising an auxiliary contactor on the starter of motor M1 operated to closed position upon closure of the starter, thus insuring operation of the control and other mechanism only when the exhauster motor is in operation.

The circuits for the operating coil 58 of the solenoid 45 and the shaker motor M2 include thermal overload relays indicated generally at R, and also included in these circuits are normally open switches S2 of a magnetic starter.

Control circuit C1, C2 is energized through connection with the control power lines L4, L5 in a manner to be described hereinafter. Included in the control circuit C1, C2 are operating coils 59 for switches S2 which, upon energization, move the switches to closed position to complete the circuits to the solenoid 58 and shaker motor M2. Also included in these last-named circuits are thermal overload relays R2. It will be readily understood, from the arrangement shown, that should the device not include filtering means, the shaker motor and controls therefor may be eliminated without in any way affecting the operation of the remainder of the apparatus.

Line C1 is permanently connected to power line L5 and completion of the circuit through line C2 to the power line L4 is accomplished in the following manner. Included in the circuit C1, C2 is a normally open switch S3 having one of its contacts permanently connected to the power line L4. Timer 54 controls the closure of switch S3 and, for this purpose, has its operating motor M3 connected to the power lines L4, L5 through circuits 60, 61. Through suitable gearing, rotation of the motor rotates a control disc 62 which causes closure of the switch S3 at predetermined intervals and for predetermined periods. This timer is adjustable in its operation in order that the frequency of operation of the switch S3 as well as the period of operation may be varied for any given condition desired.

From the apparatus and controls thus far described, it will be seen that, upon closure of the main switch (not shown) to connect the exhauster motor to its source of power, the pressure within the receiving chamber will be reduced and the conveying of material from the source of supply to the receiver will take place. With the main switch closed, the control power lines L4 and L5 will become energized, and rotation of the timer motor M3 will start. Assuming that the device is started with the timer control disc 62 in a position to leave the switch S3 in an open position, the operating coils 59 for starter switches S2 will not be energized and the switches S2 will be in their open position, so that the differential valve 32 will be closed and the exhauster will operate with full effect to reduce the pressure within the receiving chamber and material will flow to the receiver. Under these conditions, the differential of pressure on opposite sides of the discharge gate will also hold the gate in its closed position and the material conveyed will accumulate in the receiving chamber.

The conveying of material will continue under the condition described until the control disc 62 of the timer reaches the point at which it will cause closure of the switch S3. Upon closure of the switch S3, the operating coils 59 will be energized to close switches S2 and connect the operating coil 58 of solenoid 45 and shaker motor M3 to their respective sources of power. Energization of the operating coil 58 of the solenoid 45 will open the differential valve 32 to admit air at atmospheric pressure to the exhauster 31. Such short-circuiting of the exhaust duct will cause a sudden rush of air into the receiving chamber which will assist in removing the deposited material from the filter bags which are now being shaken by the operation of the shaker motor which starts simultaneously with the opening of the differential valve. The exhauster motor M1 continues to operate, and the differential valve is so adjusted that after the first rush of air into the receiver, the exhauster will be effective to cause a slight movement of air to the receiver in the direction of the exhauster. However, the reduction of differential between the two sides of the discharge gate, at the time the differential valve is opened, will permit the gate to be opened fully by the weight of the material supported thereby within the receiver. Opening of the discharge gate will cause the chamber to empty rapidly but, in order to insure that the gate will not return to its closed position before all of the material has had time to discharge, the check 20 is provided to offer a predetermined resistance to the closure of the gate. The time required for the gate to return to its closed position is substantially the same as the period of closure of the switch S3 under normal conditions. Assuming that the operation of the gate is normal, when the control disc 62 reaches the position in which the switch S3 is again opened, the operating coil 59 will become de-energized, permitting the switches S2 to fall by gravity to their open position, thus causing the differential valve to close and the shaker motor to stop operation. The full effect of the exhauster motor, which has been running continually, will then again become effective to depress the pressure within the receiving chamber and start the next period of conveying.

Under normal conditions with a uniform rate of flow of material from the source of supply to the receiver, the apparatus thus far described will operate efficiently and economically. However, devices of the present type are called upon to convey materials having varying characteristics and frequently a given material will vary in its characteristics from time to time. Under these conditions, the rate of delivery of the material to the receiver may increase to such an extent that the receiver will be flooded before the timer mechanism operates to cause a discharge of the material conveyed. To insure against such flooding, there is included in the circuit C2 a normally open mercoid switch S4 having one of its contacts permanently attached to the power line L4, this mercoid switch S4 being moved to closed position to connect the circuit C2 to the power line L4 upon the stopping of rotation of the level indicator 56 when the material reaches that point. Accordingly, should the material rise to the level of the rotary paddle 56, so as to halt the movement of this paddle, the circuit C2 will be completed to the power line L4 and the discharge of the receiver will take place, regardless of whether or not the timer mechanism has reached a discharge period. By use of this dual control for initiating discharge of the receiver, the system is operative for all conditions of material supply and may be started and left to function with assurance that discharge of the conveyed material will take place at proper intervals.

To insure that the discharge gate will be closed before conveying starts, the mercoid switch 57 carried by the discharge gate mechanism is also included in the control circuit. This switch has one contact permanently attached to the power line L4 and is so positioned on the gate mechanism that the circuit C1, C2 is completed to the power line L4 through line C3 whenever the gate is open. With this arrangement, it will be seen that, regardless of the position of the control disc 62 of the timer or the position of the switch S4 of the level indicator, the differential valve and shaker motor will be caused to function to discharge material for all open positions of the gate.

The new conveying apparatus is economical in construction and operation and it does not require the use of an air-lock feeder or a receiver containing two receiving chambers. The mechanism is efficient in operation, since conveying can only start when the receiver is fully emptied and the discharge gate completely closed. Also, injury to the apparatus resulting from the accumulation of an excessive quantity of material in the receiver is prevented. As the apparatus is fully automatic, it requires little attention and can be operated for long periods of time without interruption.

I claim:

1. In a conveying system for finely divided, crushed or granular material, a receiving chamber having a discharge opening at one lower end a conduit communicating with the receiver for directing material from a source of supply to the receiver, a pivoted closure controlling the discharge opening, an exhauster connected to the receiver for creating a depressed pressure therewithin and in the conduit, thereby causing a flow of material to the receiver and a differential of pressure on opposite sides of the closure sufficient to hold the closure in closed position, a valve chamber communicating with the system under reduced pressure, said valve chamber having openings in the walls thereof of unequal diameter connecting the valve chamber to the atmosphere, a differential valve controlling the openings, a solenoid connected to the valve controlling its operation, a switch to connect the solenoid to a source of power, operating means for the switch, a timer adapted to cause operation of the switch operating means at predetermined intervals, and means operative upon a predetermined height of material within the receiver to cause the switch operating means to function to connect the solenoid to its source of power independently of the position of the timer whereby the valve is opened at predetermined intervals or upon the conveying of a certain volume of material, whichever precedes, to reduce the effect of the exhauster within the system sufficiently to halt the flow of heavy material to the receiver and permit the discharge gate to open.

2. In a conveying system for finely divided, crushed or granular material, a receiving chamber having a discharge opening at one lower end, a conduit communicating with the receiver for directing material from a source of supply to the receiver, a pivoted closure controlling the discharge opening, an exhauster connected to the receiver for creating a depressed pressure therewithin and in the conduit, thereby causing a flow of material to the receiver and a differential of pressure on opposite sides of the closure sufficient to hold the closure in closed position, a valve chamber communicating with the system under reduced pressure, said valve chamber having openings in the walls thereof of unequal diameter connecting the valve chamber to the atmosphere, a differential valve controlling the openings, a solenoid connected to the valve controlling its operation, a switch to connect the solenoid to a source of power, operating means for the switch, a timer adapted to cause operation of the switch operating means at predetermined intervals, and means operative upon a predetermined height of material within the receiver to cause the switch operating means to function to connect the solenoid to its source of power independently of the position of the timer whereby the valve is opened at predetermined intervals or upon the conveying of a certain volume of material, whichever precedes, to reduce the effect of the exhauster within the system sufficiently to halt the flow of heavy material to the receiver and permit the discharge gate to open, and means operative upon movement of the gate to an open position to cause operation of the switch operating means thereby insuring closure of the gate during the conveying period.

3. In a conveying system for finely divided, crushed or granular material, a receiving chamber having a discharge opening at one lower end, a conduit communicating with the receiver for directing material from a source of supply to the receiver, a pivoted closure controlling the discharge opening, an exhauster connected to the receiver for creating a depressed pressure therewithin and in the conduit, thereby causing a flow of material to the receiver and a differential of pressure on opposite sides of the closure sufficient to hold the closure in closed position, a valve chamber communicating with the system under reduced pressure, said valve chamber having openings in the walls thereof of unequal diameter connecting the valve chamber to the atmosphere, a differential valve controlling the openings, a solenoid connected to the valve controlling its operation, a switch to connect the solenoid to a source of power, operating means for the switch, a source of power for the operating means, a timer adapted to connect the operating means to its source of power at predetermined intervals, means operative independently of the timer upon material reaching a predetermined height in the receiver to connect the operating means for the switch to its source of power whereby the differential valve is opened at predetermined intervals or upon the conveying of a predetermined volume of material, whichever comes first, to reduce the effect of the exhauster within the system sufficiently to halt the flow of heavy material and permit the discharge gate to open, and a mercoid switch moved to closed position upon opening of the gate to connect the operating means for the switch to its source of power independently of the timer or material operative means thereby insuring the open position of the differential valve for all open positions of the gate.

4. In a conveying system for finely divided, crushed or granular material, a receiving chamber having a discharge opening at one lower end, a conduit communicating with the receiver for directing material from a source of supply to the receiver, a pivoted closure controlling the discharge opening, an exhauster connected to the receiver for creating a depressed pressure therewithin and in the conduit, thereby causing a flow of material to the receiver and a differential of pressure on opposite sides of the closure sufficient to hold the closure in closed position, a valve chamber communicating with the system under reduced pressure, said valve chamber having openings in the walls thereof of unequal diameter connecting the valve chamber to the atmosphere, a differential valve controlling the openings, a solenoid connected to the valve controlling its operation, means to vary the degree of opening of the valve, a switch to connect the solenoid to a source of power, operating means for the switch, a source of power for the operating means, a timer adapted to connect the operating means to its source of power at predetermined intervals, means operative independently of the timer upon the material reaching a predetermined height in the receiver to connect the operating means for the switch to its source of power whereby the differential valve is opened at predetermined intervals or upon the conveying of a predetermined volume of material, whichever comes first, to reduce the effect of the exhauster within the system sufficiently to halt the flow of heavy material and permit the discharge gate to open, and a mercoid switch moved to closed position upon opening of the gate to connect the operating means for the switch to its source of power, thereby insuring the open position of the differential valve for all open positions of the gate.

5. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, a valve for controlling the inlet, means for operating the valve, and means responsive to the positions of the closure for preventing the valve from being closed by its operating means when the closure is open.

6. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, a valve for controlling the inlet, means for operating the valve, a timer for controlling the valve operating means, and means responsive to the positions of the closure for preventing the valve from being closed by its operating means when the closure is open.

7. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, means for operating the valve, a timer for controlling the valve operating means, and means operable upon the accumulation of a predetermined volume of material in the receiver for causing the valve operating means to open the valve.

8. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, a valve for controlling the inlet, means for operating the valve, a timer for controlling the valve operating means, means responsive to the positions of the closure for preventing the valve from being closed by its operating means when the closure is open, and means operable upon the accumulation of a predetermined volume of material in the receiver for causing the valve operating means to open the valve.

9. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, a valve movable between two positions, in one of which it closes the inlet entirely and in the other of which it opens the inlet to admit air into the receiver and conduit in volume sufficient to stop the conveying of material but insufficient to prevent maintenance of a slightly subatmospheric pressure in the receiver and conduit, means for operating the valve, and a timer for causing the valve operating means to open and close the valve at predetermined intervals.

10. In a conveying system for finely divided, crushed, or granular material, the combination of a receiver having a bottom discharge opening, a conduit for conducting material from a source of supply to the receiver, a movable closure for the discharge opening, an exhauster connected to the receiver for creating a reduced pressure therein and in the conduit to cause a flow of material into the receiver through the conduit and to hold the closure closed against the weight of the material resting thereon, an inlet for admitting atmospheric air into the interior of the receiver and the conduit, a valve for controlling the inlet, means for operating the valve, a timer for causing the valve operating means to open and close the valve at intervals, and a check connected to the closure and controlling the movement thereof to closed position, the time required for the return movement of the closure under control of the check being substantially that during which the valve is held open by its operating means under control of the timer.

PHILIP R. HORNBROOK.